Feb. 9, 1954 H. A. IAMS 2,668,869

RADIO VIEWING SYSTEM

Filed Feb. 26, 1945 2 Sheets-Sheet 1

INVENTOR.
Harley A. Iams
BY C. D. Tuska
ATTORNEY

Feb. 9, 1954

H. A. IAMS 2,668,869

RADIO VIEWING SYSTEM

Filed Feb. 26, 1945

2 Sheets-Sheet 2

INVENTOR.
Harley A. Iams
BY C. D. Tuska
ATTORNEY

Patented Feb. 9, 1954 2,668,869

UNITED STATES PATENT OFFICE 2,668,869

RADIO VIEWING SYSTEM

Harley A. Iams, Princeton, N. J., assignor to Radio Corporation of America, a corporation of Delaware Application February 26, 1945, Serial No. 579,871

8 Claims. (Cl. 178—6.8)

My invention relates to systems for viewing scenes in darkness or obscured by fog, smoke or the like, and in particular it relates to systems of this type wherein the scene is viewed as though it were a motion picture.

An object of the invention is to provide an improved method of and means for obtaining a view of a scene by utilizing radio waves radiated or reflected therefrom.

A further object of the invention is to provide an improved method of and means for scanning the image of a scene that is obscured by darkness, fog or the like.

A further object of the invention is to provide an improved device for changing the size or position of a radio wave image.

In practicing one embodiment of the invention, the radio waves received from a scene are imaged by means of a mirror or a lens and this image is scanned by means of a plurality of radially positioned wave guides. The signal from the device is amplified and supplied to an image reproducer such as a cathode ray tube which has its cathode ray deflected in synchronism with the scanning of the radio wave image whereby a view of the scene is obtained. According to one embodiment of the invention, a plurality of wave guides assembled in tapered relation to form an "image shrinker" are employed to reduce the size of the image so that it may be scanned more easily.

Figures 1, 2:
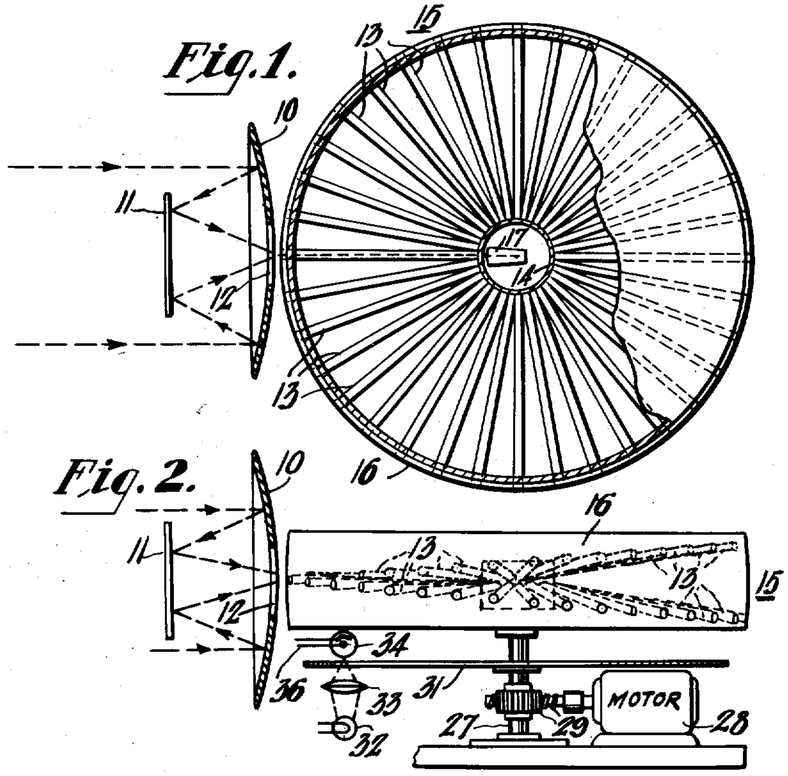
Figures 3, 4, 5, 6, 7, 8:
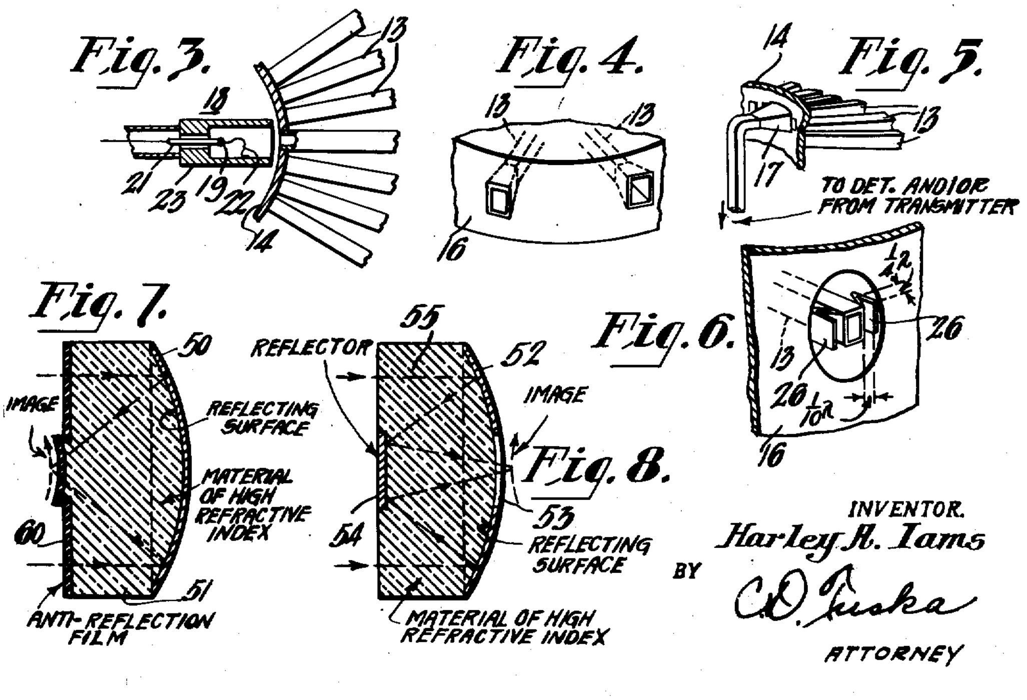
Figure 9:
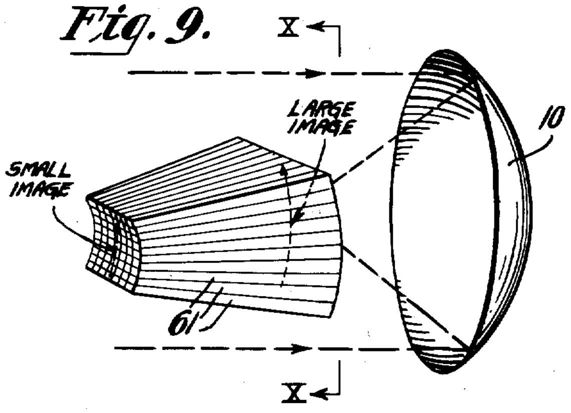
Figure 10:
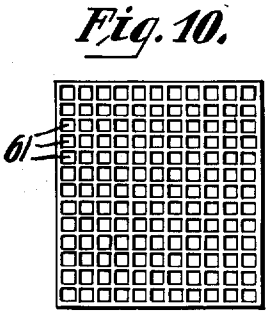
Figures 11, 11A, 12:
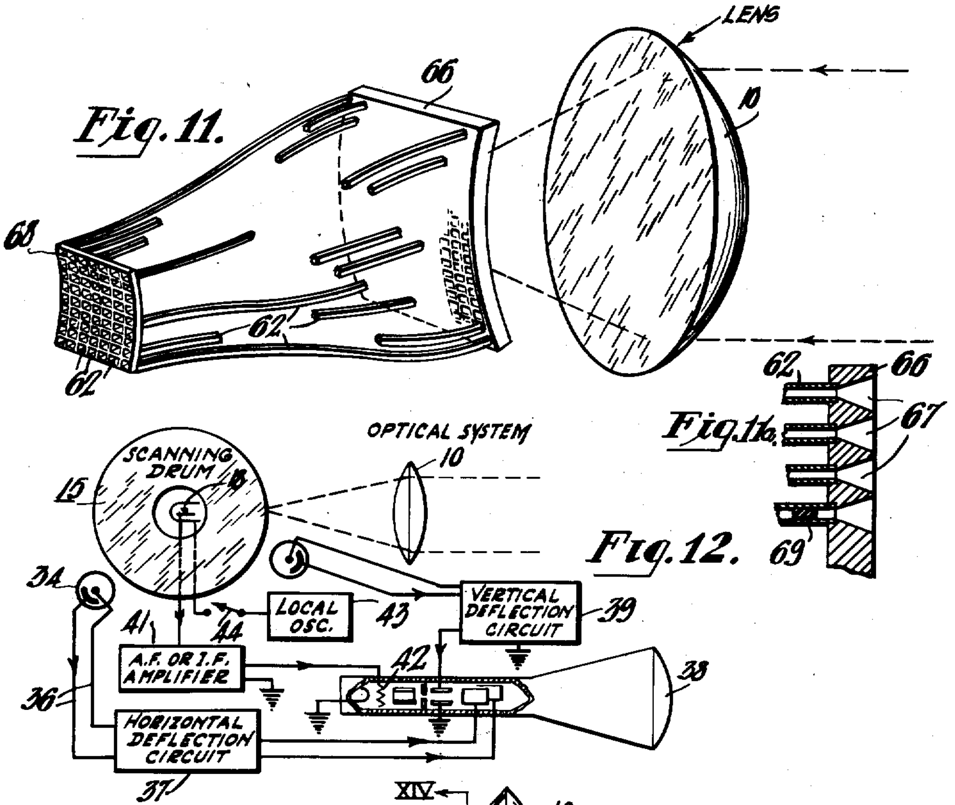
Figures 13, 14:
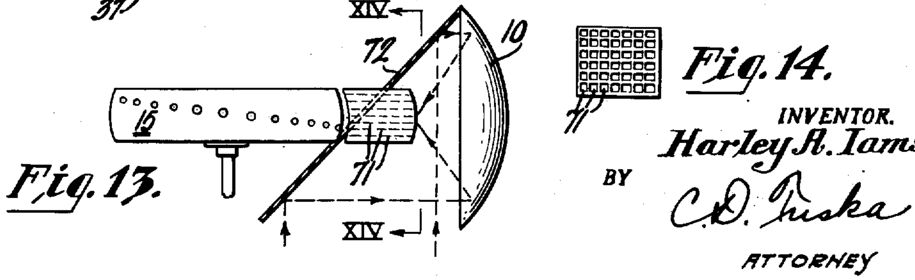

The invention will be better understood from the following description taken in connection with the accompanying drawing in which Figure 1 is a plan view of one embodiment of the invention, Figure 2 is a side view of the apparatus shown in Fig. 1, Figures 3 and 4 are detail views of portions of the apparatus shown in Figs. 1 and 2, Figures 5 and 6 are perspective views of modified portions of the apparatus shown in Figs. 1 and 2, Figures 7 and 8 are side views of optical systems that may be employed to obtain a radio wave image, Figure 9 is a perspective view of an "image shrinker" constructed in accordance with one embodiment of the invention, Figure 10 is an end view taken on the line X—X of Fig. 9, Figure 11 is a perspective view of an "image shrinker" constructed in accordance with another embodiment of the invention, Figure 11a is a fragmentary view in cross-section of a portion of the "image shrinker" shown in Fig. 11, Figure 12 is a block and circuit diagram of a viewing system embodying the invention, Figure 13 is a side view of another embodiment of the invention, and Figure 14 is an end view taken on the line XIV—XIV of Fig. 13.

In the several figures, similar parts are indicated by similar reference characters.

Referring to Figs. 1 and 2, the radio waves reflected from a scene to be viewed are imaged by a concave mirror such as a spherical mirror 10, the waves from the mirror 10 being reflected by a plane mirror 11 so that the image is formed at the back of the mirror 10 opposite an opening 12 therein. It is assumed that the waves received from the scene are obtained from transmitters or beacons in the scene, or by "illuminating" or flooding the scene with radio waves of a wave length short enough to permit the formation of a sufficiently sharp image with an optical system of convenient size, but long enough to pass through clouds and fog. Wave lengths of about one centimeter, for example, or shorter are suitable.

The image opposite the opening 12 is scanned by a scanning drum 15 comprising a plurality of wave guides 13 that are mounted similar to the spokes of a wheel. The inner ends of the wave guides 13 are supported on a hub 14 with their open ends lying in a circle. The outer ends of the wave guides 13 are supported by a cylindrical member 16 and have their open ends lying on a helix, the outer end of each wave guide 13 being displaced axially with respect to the end of the next adjacent wave guide. As the scanning drum 15 is rotated, the outer ends of the wave guides sweep past and scan the image of the scene to be viewed. As a result, the energy corresponding to each picture element passes down the wave guides 13 where it feeds into a utilization device, such as a wave guide 17 shown in Fig. 5, that guides the energy picked up to a detector or mixer (not shown). Or the utilization device may be a crystal detector 18 or the like such as shown in Fig. 3.

The detector 18 may comprise a crystal 19 of silicon, for example, supported on the inner conductor 21 of a coaxial line, and a "cat whisker" 22 attached to the outer conductor 23.

As illustrated in Fig. 4, the outer ends of the wave guides 13 may flare out to form horns whereby more energy is picked up and whereby the inner ends may still have a small cross-section at the hub 14 where space is limited. Also, the outer ends of the wave guides 13 may be provided with metal folds 26 as shown in Fig. 6; this form is preferred for scanning an "image shrinker" such as is shown in Fig. 11, since it was found to minimize pick-up from the wave guides adjacent the one being scanned.

Fig. 2 shows the scanning drum 15 mounted on a vertical shaft 27 that is rotated by a motor 28 through gears 29. An apertured disc 31 for providing synchronizing pulses may also be mounted on the shaft 27. Light from a lamp 32 is focused by a lens 33 on the apertures in the disc 31 whereby pulses of light strike a photoelectric cell 34 to produce synchronizing pulses that are supplied over conductors 36 to a horizontal deflecting circuit 37 of a cathode ray tube 38 (Fig. 12). A similar optical and aperture arrangement, indicated schematically in Fig. 12, supplies vertical synchronizing pulses to a vertical deflecting circuit 39. Synchronizing means of the above-described character is well known in the television art.

As shown in Fig. 12, the output of the detector 18 is supplied through an amplifier 41 to the control grid 42 of the cathode ray tube 38. If desired, a superheterodyne system may be employed. For example, the output of a local oscillator 43 may be applied to the detector 18 by closing a switch 44. In this case, the amplifier 41 is an I. F. amplifier, and either a second detector (not shown) is provided, or the grid 42 of the cathode ray tube 38 is biased so that the grid and cathode of the cathode ray tube function as a detector.

From the foregoing it will be evident that there appears on the phosphorescent screen on the end of the cathode ray tube 38 a visual image of the scene corresponding to the radio wave image being scanned by the scanning drum 15.

By employing at a transmitter the wave guide 17 in the combination shown in Fig. 1, the scene to be viewed may be illuminated by flying spot scanning. This transmitter arrangement is the reverse of the receiver combination in that the energy from the transmitter is radiated from the wave guide 17 into the wave guides 13. In the case of flying spot scanning, the transmitter and receiver scanning must be synchronized as is well understood in the art.

If the transmitter is pulsed, well known radar technique may be employed for utilizing a scanning system that is common to both transmitter and receiver. In a pulsed system there should be at least one pulse transmitted for each desired picture element. Following radar practice, the receiver may be "gated" so that only echo pulses received during a certain time interval following transmission of a pulse are applied to the cathode ray tube. Thus, a picture may be obtained showing only objects within a certain range of distances from the transmitter.

Figs. 7 and 8 show two optical systems in which the image is formed in a medium of high index of refraction for obtaining a smaller size radio wave image, whereby it may be scanned more conveniently. Since the size of the image is inversely proportional to the index of refraction, a material having a high index of refraction is selected. The material should also be a good dielectric. An example of such material is "Mycalex." In Fig. 7, the image is formed by a spherical mirror surface 50 on a block 51 of "Mycalex," for example. In Fig. 8, a spherical mirror surface 52 on a block of "Mycalex" 55 has an opening 53 therein through which the waves imaged by the mirror 52 may be reflected from a plane mirror 54 to form an image at the rear of the optical system. If desired, the front surface of the block of "Mycalex" or other refractive material may be provided with an anti-reflection layer or coating 60 of "Lucite" or the like as described and claimed in my copending application Serial No. 532,381, filed April 22, 1944, Patent No. 2,415,352, and entitled Lenses for Radio Frequency Waves. Also the front surface may be shaped to form the correcting surface of the well known Schmidt optical system.

Reference will now be made to Figs. 9 and 11 which show "image shrinkers" for reducing the size of a radio wave image. The use of "image shrinkers" may be desirable under the same conditions that the use of the optical systems of Figs. 7 and 8 may be desirable, namely, when it is not convenient to make a scanning drum that is big enough to scan the image that is obtainable. Also, the "image shrinker" may be employed when other methods of reducing the image size would result in loss of resolution through diffraction effects. The "image shrinker" comprises a bundle or assembly of wave guides 61 (Fig. 9) or 62 (Fig. 11) assembled in tapered relation to receive the radio wave image at the large end and transmit it to a smaller area at the other end. That this device can be of substantial help is seen from the fact that although the minimum spot size is, for many optical systems, limited to the order of one square wave length, the energy from this area can be put into a wave guide and delivered over an area such as $\frac{1}{10}$ square wave length, or even less. Thus, the area to be scanned can be reduced to such a factor as $\frac{1}{10}$ of the initial image area, for example.

Referring more particularly to Fig. 9, the rectangular wave guides 61 are tapered from the large end to the small end of the "image shrinker." In this example, the radio wave image is formed by the spherical mirror 10 although any other image forming means may be employed. The large end of the "image shrinker" is positioned substantially in the plane of the radio wave image formed by the mirror 10 whereby the desired smaller image appears at the smaller end of the wave guide assembly. Fig. 10, taken on the line X—X of Fig. 9, shows the ends of the wave guides 61 as they appear at the large end of the "image shrinker." As shown in Fig. 9, at the large end of the "image shrinker," the ends of the wave guides 61 lie on a curved surface to conform to the curvature of the focal plane of the mirror 10 and to the corresponding curvature of the image. At the small end of the "image shrinker," the ends of the wave guides 61 lie on a surface curved for convenience in scanning.

Referring again to Fig. 11, each wave guide 62 preferably is rectangular in cross section so that a bend in the wave guide cannot rotate the plane of polarization of a wave passing therethrough. However, the wave guides 62 may be of circular cross section or other shape, if desired. At the larger end of the "image shrinker," the wave guides 62 may be supported as shown in Figs. 11 and 11*a* by a plate 66 having rectangular tapered openings 67 therein which function as horns for the ends of the wave guides 62. At the smaller end of the "image shrinker" the wave guides 62 are supported by a plate 68, or clamped together in a frame.

The wave guides in the structure shown in Fig. 11 (but not necessarily those in Fig. 13) will usually be of somewhat different lengths. When this makes the signals in adjacent wave guides out of phase by more than say a quarter period, it may be desirable to adjust the phase velocity by inserting thin strips or rods of dielectric 69 (Fig. 11*a*) such as polystyrene in the shorter wave guides. The pieces of dielectric may be of like cross section but of different lengths such that the time of wave propagation is approximately the same in each wave guide or varies in steps of complete cycles of the radio frequency whereby a uniform phase relation of the fields corresponding to the different picture elements is maintained.

The "image shrinker" can also be used in the reverse direction to provide wide-angle scanning at the transmitter, for example, or, as illustrated in Fig. 13, it may be used in 1 to 1 ratio to transfer an image from one place to another. Figs. 13 and 14 show how an assembly of wave guides 71 can be used to bring an image into a position where it can be scanned without blocking the optical system by the scanner 15. In the example illustrated, a plane mirror 72 with an opening at the center is set at 45 degrees to the optical axis to reflect the incoming radio waves to the image forming mirror 10.

According to another feature of the invention, by making the arrangement of the "image shrinker" wave guides different at the two ends of the bundle or assembly, it is possible to garble the picture so that the video signals can be broadcast without loss of secrecy. In this case, the final picture may be viewed through a bundle of Lucite rods in which the arrangement of the ends is similar to that in the "image shrinker," or the picture may be reassembled in the scanning of the viewing device.

I claim as my invention:

1. A radio wave optical device for changing the size of a radio wave image, said device comprising a bundle of wave guides that are assembled in tapered relation whereby the ends of the wave guides at one end of the device occupy or cover a larger surface area than at the other end of the device, each of said wave guides terminating in a horn at said one end of the device, each of said wave guides being of substantially uniform cross section throughout the major portion of its length.

2. A radio wave optical device for changing the position of a radio wave image, said device comprising an assembly of radio wave guides which are of substantially uniform cross section throughout the major portion of their length, the ends of the wave guides at one end of said device lying on and defining a surface that has a curvature corresponding to the curvature of said image and the ends of the wave guides at the other end of said device lying on and defining another surface of predetermined geometric shape.

3. Means for imaging radio waves from a scene to be viewed whereby a radio wave image is formed, means for decreasing the size of said image and means for scanning the resulting radio wave image of decreased size.

4. A radio wave scanning device, said device comprising a plurality of scanning wave guides assembled in radial relation similar to the spokes of a wheel with their inner ends lying on a circle and with their outer ends lying on a helix whereby said image or scene may be scanned by the outer ends of said scanning wave guides by rotating said radial wave guide assembly, a radio wave transfer device positioned opposite the inner ends of said wave guides with an aperture in said transfer device that is so dimensioned with respect to the cross section of said wave guides that no more than two wave guides are opposite said aperture at any one time.

5. A system for scanning a radio wave image, said system comprising a plurality of scanning wave guides mounted in radial relation similar to the spokes of a wheel with their inner ends lying on a circle and with their outer ends lying on a helix, and a wave transfer device comprising a bundle of wave guides having one end thereof located substantially in the plane of a radio wave image whereby said image is transferred to the other end of said transfer device, said device having said other end located to position the transferred image substantially in a plane that is scanned by the outer ends of said scanning wave guides when said radial wave guide assembly is rotated.

6. In combination, means for imaging radio waves from a scene to be viewed whereby a radio wave image is formed, a scanning device comprising a plurality of wave guides assembled in radial relation similar to the spokes of a wheel with their inner ends lying on a circle and with their outer ends lying on a helix, said image being located substantially in a plane that is scanned by the outer ends of said scanning wave guides when said scanning device is rotated, and an energy collecting device having one end that is apertured and which is positioned opposite the inner ends of said scanning wave guides whereby it may collect energy from each scanning wave guide as the inner ends thereof sweep past said one end, said aperture being so dimensioned with respect to the cross section of said wave guides that no more than two wave guides are opposite said aperture at any one time.

7. In combination, means for imaging radio waves from a scene to be viewed whereby a radio wave image is formed, a scanning device comprising a plurality of wave guides assembled in radial relation similar to the spokes of a wheel with their inner ends lying on a circle and with their outer ends lying on a helix, and an image transfer device comprising a bundle of wave guides having one end thereof located substantially in the plane of said radio wave image whereby said image is transferred to the other end of said transfer device, said transfer device having said other end located to position the transferred image substantially in a plane that is scanned by the outer ends of said scanning wave guides when said scanning device is rotated, and an energy collecting device positioned opposite the inner ends of said scanning wave guides to collect energy from each scanning wave guide as its inner end sweeps past said energy collecting device.

8. In combination, means for imaging radio waves from a scene to be viewed whereby a radio wave image is formed, and a radio wave optical device comprising an assembly of radio wave guides having one end thereof located substantially in the plane of said radio wave image whereby said image is transferred to the other end of said device, each end of said device being a surface of predetermined geometric shape, the ends of each wave guide terminating on said surfaces.

HARLEY A. IAMS.

(References on following page)

References Cited in the file of this patent

UNITED STATES PATENTS

| Number | Name | Date |
|---|---|---|
| Re. 21,105 | Round | May 30, 1939 |
| 1,683,137 | Jenkins | Sept. 4, 1928 |
| 1,699,270 | Baird | Jan. 15, 1929 |
| 2,083,292 | Cawley | June 8, 1937 |
| 2,129,669 | Bowen | Sept. 13, 1938 |
| 2,155,471 | Cawley | Apr. 25, 1939 |
| 2,206,683 | Wolff | July 2, 1940 |
| 2,283,935 | King | May 26, 1942 |
| 2,306,272 | Levy | Dec. 22, 1942 |
| 2,354,591 | Goldsmith | July 25, 1944 |
| 2,442,951 | Iams | June 8, 1948 |

FOREIGN PATENTS

| Number | Country | Date |
|---|---|---|
| 330,090 | Germany | Dec. 7, 1920 |
| 495,977 | Great Britain | Nov. 23, 1938 |